Jan. 6, 1970 A. ROVELL 3,488,562
CONSTANT SOURCE FOR INDUCTIVE LOADS INCLUDING SERIES CONNECTED NONSATURATING TRANSISTOR AND A TRANSISTOR SHUNTED RESISTOR
Original Filed Aug. 4, 1966
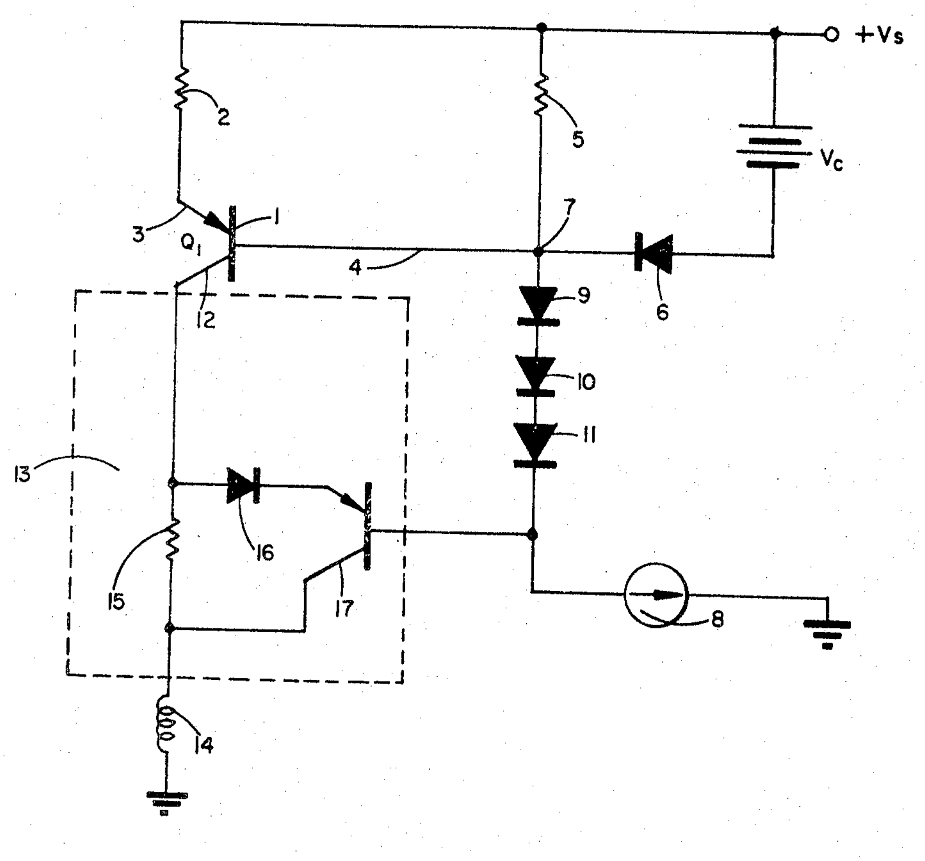
INVENTOR.
ALEXANDER ROVELL
BY Robert D. Rogers
ATTORNEY United States Patent Office 3,488,562

Patented Jan. 6, 1970

3,488,562

CONSTANT SOURCE FOR INDUCTIVE LOADS INCLUDING SERIES CONNECTED NON-SATURATING TRANSISTOR AND A TRANSISTOR SHUNTED RESISTOR

Alexander Rovell, Downey, Calif., assignor to North American Rockwell Corporation, a corporation of Delaware Continuation of application Ser. No. 570,368, Aug. 4, 1966. This application Mar. 6, 1969, Ser. No. 805,045

Int. Cl. H01h 47/32; G05f 3/00

U.S. Cl. 317—148.5 4 Claims

ABSTRACT OF THE DISCLOSURE

A circuit for supplying substantially constant current to an inductive load. A first transistor, appropriately biased to prevent its saturation when driving current through the load, is connected in series with a resistor and the load. The resistor is shunted by a diode in series with the emitter and collector of a second transistor. A current trigger causes conduction of the first transistor, with the high initial back-voltage developed across the load during current use time causing the diode to be forward biased and the second transistor turned on, thereby shorting the resistor out of the circuit. At the end of the current rise time the second transistor turns off, and under steady state conditions, the unsaturated first transistor and resistor are directly series connected with the load.

This is a continuation of application Ser. No. 570,368, filed Aug. 4, 1966.

This invention relates to a circuit for supplying current to an inductive load and, more particularly, to such a circuit for reducing the power dissipated by the active elements of a current source during steady state conditions.

Under steady state conditions, the voltage across an inductive load such as a read or write head in a computer, is very low, although the current is relatively high. As a result, the voltage drop across the current source supplying the current causes a high power dissipation within the current source. In a typical embodiment using a transistor as a current source, in order to prevent degrading of operating characteristics by exceeding the power requirements of a particular transistor, several transistors must be used in parallel to supply the current. In that manner the current requirements and, therefore, the power requirements of each is reduced.

Preferably, a current source should be able to supply current to an inductive load without the necessity for adding stages, in as much as each added stage increases costs and reduces the overall reliability. Each additional stage also tends to increase the output capacitance and decrease the output impedance of the current source which is undesirable.

Ideally, if the voltage drop across the current source could be divided or reduced below the maximum power capabilities of the source, the number of stages could be reduced.

However, the voltage must be available across the load during the period the current through the load is changing so that sufficient potential is available to accomodate it.

The present invention satisfies the requirements described above by providing the current source with a switching means for switching a dissipating resistor into the circuit between the source and the load during steady state conditions, for dropping the voltage across the resistor instead of across the source, and for switching the resistor out of the circuit when the current through the load is rising, so that the full available voltage is impressed across the load. The switch is actuated by the change in voltage across the load so that it automatically switches the resistor in and out of the circuit in response to the voltage changes across the load.

Therefore, it is an object of this invention to provide a circuit having a relatively reduced number of stages for supplying steady state current to an inductive load and for providing voltage to the load during other periods.

It is another object of this invention to reduce the number of output stages in a current source without interfering with the operating characteristics of the circuit.

It is still a further object of this invention to reduce the power dissipated by a plurality of output stages supplying current to an inductive load by dissipating the power in a resistor.

A still further object of this invention is to provide a circuit for inserting a resistor into the circuit to dissipate power in the resistor when steady state current is supplied to an inductive load.

Another object of this invention is to provide means for reducing the number of output stages by switching a resistor in series with the current source and inductive load during steady state conditions.

Another object of the invention is to reduce power dissipation in a current source during steady state conditions and for developing full available voltage across an inductive load during conditions when the current through the load is rising.

These and other objects of this invention will become more apparent in connection with the following drawings of which, The figure is a schematic representation of one embodiment of a circuit for supplying current to an inductive load.

Referring now to the figure, wherein is shown a PNP transistor 1, having its emitter 3 connected through resistor 2 to voltage, $V_s$. Base 4 of the transistor is biased by resistor 5, diode 6 and clamping voltage, $V_c$. The voltage at point 7 is approximately the source voltage minus the clamping voltage and the drop across diode 6, when transistor 1 is conducting the full load current. The bias voltage is selected so that when transistor 1 is fully conducting it is not in saturation.

Current source 8, which is connected through diodes 9, 10 and 11 to the base of transistor 1, may be a standard transistor current source which provides the bias and turn-on currents for transistor 1, and, therefore, determines the timing and rise-time of the load current. A voltage source with the proper output resistance may also be used in place of current source 8.

The collector 12 of transistor 1 is connected through switch means 13 to the inductive load 14. The load may comprise the inductance of a word line in a computer memory, or any other type of inductive load.

The switching circuit in one embodiment is comprised of a resistor 15, shunted by diode 16 and transistor 17. The transistor is a PNP transistor having its collector connected to the inductive load, its emitter connected through diode 16 to the collector of transistor 1, and its base connected to current sources 8 and the cathode of diode 11. Transistor 17 is biased out of conduction, or off, by the difference in voltages appearing at its base and emitter during steady state conditions.

Although PNP transistors are shown and described, NPN transistors, a combination of NPN and PNP transistors, or other semi-conductor devices such as metal oxide semi-conductors, may also be used in embodiments of the invention providing voltages of proper polarities and proper biasing are taken into consideration.

In operation, for example, when it is desired to write something into a memory location, current source 8 generates a trigger or actuating pulse which causes transistor 1 to begin to conduct. At that instance, since the current through the load is rising, a high reactance voltage is generated which, together with the drop across resistor 15, causes diode 16 to be forward-biased and transistor 17 to be cut on, thereby shorting resistor 15 out of the circuit. As a result, the full voltage available at the collector of transistor 1 is impressed across the load to drive the current through the inductor.

At the end of the current rise time through the load, the voltage begins to decrease due to the low resistance of the inductive load, and transistor 17 is turned off. When transistor 17 is off, resistance 15 is switched in series between transistor 1 and the load. The steady state current through the load causes a voltage drop across resistor 15 so that instead of all the voltage being dropped across transistor 1, it is dropped partially across transistor 1 and mostly across the resistor. As a consequence, the power dissipated by the transistor is reduced. Without the resistor, more transistors would have to be added so that the power limits of each would not be exceeded. In other words, the current supplied to the load would be divided equally between several transistors so that the power dissipated by each would be less.

Although the invention has been described and illustrated in detail, it is to be understood that the same is by way of illustration and example only, and is not to be taken by way of limitation.

I claim:

1. A circuit for supplying substantially constant current to an inductive load without dissipating excessive power and for developing maximum voltage across the load during the initial rise time of the current through the load, said circuit comprising, a source of current $(V_s)_2$ a resistor (15) connected in series with said source of current and said inductive load (14), sistor (15) and said source of current $(V_s)$ and having a control electrode (4), first means $(V_s, V_c,$ 6, 5) connected to said control electrode for biasing said first control device normally off, second means (8) connected to said control electrode for generating a drive signal to turn said first control device on for connecting said source of current to said inductive load through said resistor, a second control device (17, 16) having a control electrode responsive to the signal on said first recited control electrode (4), said second control device further being responsive to the voltage drop across said resistor (15) and said load (14) after said first control device is turned on for shunting said resistor during the period the current through said inductive load is increasing and for preventing said first device from becoming saturated.

2. The combination recited in claim 1 wherein said second control device (17, 16) comprises means (9, 10, 11, 7, 8) for disconnecting said shunt from said resistor after the current through said load reaches a constant level and when the voltage across said resistor (15) reaches a maximum value for preventing excessive power dissipation by said first control device, said resistor voltage being less than the voltage required to turn said second control device on.

3. A circuit for supplying substantially constant current to an inductive load without dissipating excessive power and for developing maximum voltage across the load during the initial rise time of the current through the load, said circuit comprising, a source of current $(V_s)$, a first resistor (15) connected in series with said source of current and said inductive load (14), a first transistor $(Q_1)$ having an emitter (3) connected to said source of current and a collector (12) connected to said resistor (15), said first transistor further having a base electrode (4), a second resistor (2) connected through said emitter and said source of current, first means $(V_s, V_c,$ 6, 5) connected to said base electrode for biasing said first transistor normally off, second means (8) connected to said base electrode for generating a drive signal to turn said first control device on for connecting said source of current to said inductive load through said first resistor, a second control device having a control electrode responsive to the signal on said base electrode; said second control device including means (16 $V_{eb}$ of 17, 9, 10, 11, 7) for clamping said collector to a voltage for preventing saturation of said first transistor during the initial rise time of said current through the load, said second control device being further responsive to the voltage drop across said first resistor and said load after said first transistor is turned on for shunting said first resistor during the period the current through said load is increasing.

4. The combination recited in claim 2 wherein said second control device includes a transistor (17) having one electrode (collector) connected between said resistor and said load, and a second electrode (emitter), said second control device also includes a diode (16) having one electrode (anode) connected between said resistor (15) and said first control device $(Q_1)$ and having its other electrode (cathode) connected to the second electrode (emitter) of said transistor (17), said diode and said transistor (17) being turned on during the initial rise time of the current through the load in response to the voltage dropped across the load and said resistor (15).

References Cited

UNITED STATES PATENTS

| | | | |
|---|---|---|---|
| 3,040,239 | 6/1962 | Walker. | |
| 3,116,441 | 12/1963 | Gieffers | 317—148.5 |
| 3,172,020 | 3/1965 | Spinelli et al. | 317—155.5 |
| 3,235,775 | 2/1966 | Winston | 317—148.5 |

FOREIGN PATENTS

| | | |
|---|---|---|
| 899,090 | 6/1962 | Great Britain. |

LEE T. HIX, Primary Examiner

W. H. BEHA, Jr., Assistant Examiner

U.S. Cl. X.R.

323—96

PO-1050
(5/69)

UNITED STATES PATENT OFFICE
CERTIFICATE OF CORRECTION

Patent No. 3,488,562 Dated January 6, 1970

Inventor(s) Alexander Rovell

It is certified that error appears in the above-identified patent and that said Letters Patent are hereby corrected as shown below:

Claim 1, column 3, line 6, after "($V_s$)" delete "2" and insert --,--; lines 8 and 9, after "(14)" insert --a first control device ($Q_1$) connected between said re--.

Claim 3, column 4, line 13, delete "through" and insert --between--.

SIGNED AND
SEALED
JUL 7 1970

(SEAL)
Attest:

Edward M. Fletcher, Jr.
Attesting Officer

WILLIAM E. SCHUYLER, JR.
Commissioner of Patents